US009289869B1

(12) United States Patent
Lelonek

(10) Patent No.: US 9,289,869 B1
(45) Date of Patent: Mar. 22, 2016

(54) WORKPIECE HOLDER

(71) Applicant: David J. Lelonek, Orchard Park, NY (US)

(72) Inventor: David J. Lelonek, Orchard Park, NY (US)

(*) Notice: Subject to any disclaimer, the term of this patent is extended or adjusted under 35 U.S.C. 154(b) by 415 days.

(21) Appl. No.: 13/784,155

(22) Filed: Mar. 4, 2013

(51) Int. Cl.
*B23Q 3/06* (2006.01)
*B23Q 3/00* (2006.01)
*B25B 11/00* (2006.01)

(52) U.S. Cl.
CPC ..................................... *B23Q 3/062* (2013.01)

(58) Field of Classification Search
CPC ............. B23Q 3/00; B23Q 3/06; B23Q 3/062
USPC ......... 269/32, 24, 27, 228, 289 R, 20, 47, 48, 269/48.1, 309; 403/381
See application file for complete search history.

(56) References Cited

U.S. PATENT DOCUMENTS

| 790,479 | A | | 5/1905 | Carr et al. | |
|---|---|---|---|---|---|
| 1,454,148 | A | | 5/1923 | Bisset | |
| 3,565,416 | A | * | 2/1971 | Williamson et al. | 269/47 |
| 4,221,391 | A | | 9/1980 | Dutton | |
| 4,300,271 | A | | 11/1981 | Wohlhaupter | |
| 4,577,846 | A | | 3/1986 | Buchler | |
| 4,667,971 | A | * | 5/1987 | Norton et al. | 279/121 |
| 4,909,110 | A | | 3/1990 | Borzym | |
| 5,019,129 | A | | 5/1991 | Johanson | |
| 5,423,524 | A | | 6/1995 | Searle | |
| 5,551,676 | A | | 9/1996 | Tibbet | |
| 5,551,795 | A | | 9/1996 | Engibarov | |
| 5,649,694 | A | * | 7/1997 | Buck | 269/43 |
| 5,673,905 | A | | 10/1997 | Kiene | |
| 5,921,534 | A | * | 7/1999 | Swann et al. | 269/136 |
| 6,079,704 | A | * | 6/2000 | Buck | 269/242 |
| 6,139,001 | A | * | 10/2000 | Buck | 269/136 |
| 6,170,814 | B1 | * | 1/2001 | Swann et al. | 269/329 |
| 6,174,102 | B1 | | 1/2001 | Do et al. | |
| 6,202,996 | B1 | * | 3/2001 | Cutsforth et al. | 269/137 |
| 6,349,929 | B1 | | 2/2002 | Speltz et al. | |
| 6,350,080 | B1 | | 2/2002 | Do et al. | |
| 6,409,161 | B1 | * | 6/2002 | Wolff et al. | 269/43 |
| 6,485,214 | B2 | * | 11/2002 | Schill | 403/13 |
| 6,598,867 | B2 | | 7/2003 | Martinez | |
| 6,957,809 | B1 | | 10/2005 | Ferrara et al. | |
| 7,036,810 | B2 | * | 5/2006 | Wal, III | 269/296 |

(Continued)

FOREIGN PATENT DOCUMENTS

JP          02100878          4/1990

*Primary Examiner* — Joseph J Hail
*Assistant Examiner* — Jon Taylor
(74) *Attorney, Agent, or Firm* — Woods Oviatt Gilman LLP; Dennis B. Danella, Esq.

(57) ABSTRACT

A workpiece holder for selectively mounting a workpiece along x, y and z axes is provided. A stationary base clamp includes a first protrusion extending from a first top surface having a first contact surface positioned at an acute angle relative to the first top surface. A clamp dog is slidably disposed within a partial slot defined in the base clamp and includes a second protrusion extending from a second top surface. The second protrusion may include second and third contact surfaces that are both positioned at an acute angle relative to the second top surface. An adjustment mechanism operatively connects the base clamp and clamp dog to selectively move the workpiece holder between clamped and release positions. In particular, the second protrusion is moved away from the first protrusion to the clamped position so that the contact surfaces engage a dovetail wall of a recess formed in the workpiece.

38 Claims, 15 Drawing Sheets

(56) References Cited

U.S. PATENT DOCUMENTS

| | | |
|---|---|---|
| 7,182,327 B1 | 2/2007 | Ferrara et al. |
| 7,303,186 B2 * | 12/2007 | Yonezawa et al. ............ 269/309 |
| 7,712,401 B1 | 5/2010 | Greenwald |
| 8,113,497 B2 | 2/2012 | Kellerson |
| 8,181,949 B2 | 5/2012 | Hung |
| 8,800,982 B2 * | 8/2014 | Kawakami ................... 269/48.3 |
| 2005/0121846 A1 * | 6/2005 | Kawakami .................... 269/309 |
| 2010/0052234 A1 | 3/2010 | Ryai, Sr. |
| 2010/0219573 A1 | 9/2010 | O'Rell et al. |
| 2013/0249156 A1 * | 9/2013 | Haruna et al. ................. 269/32 |

* cited by examiner

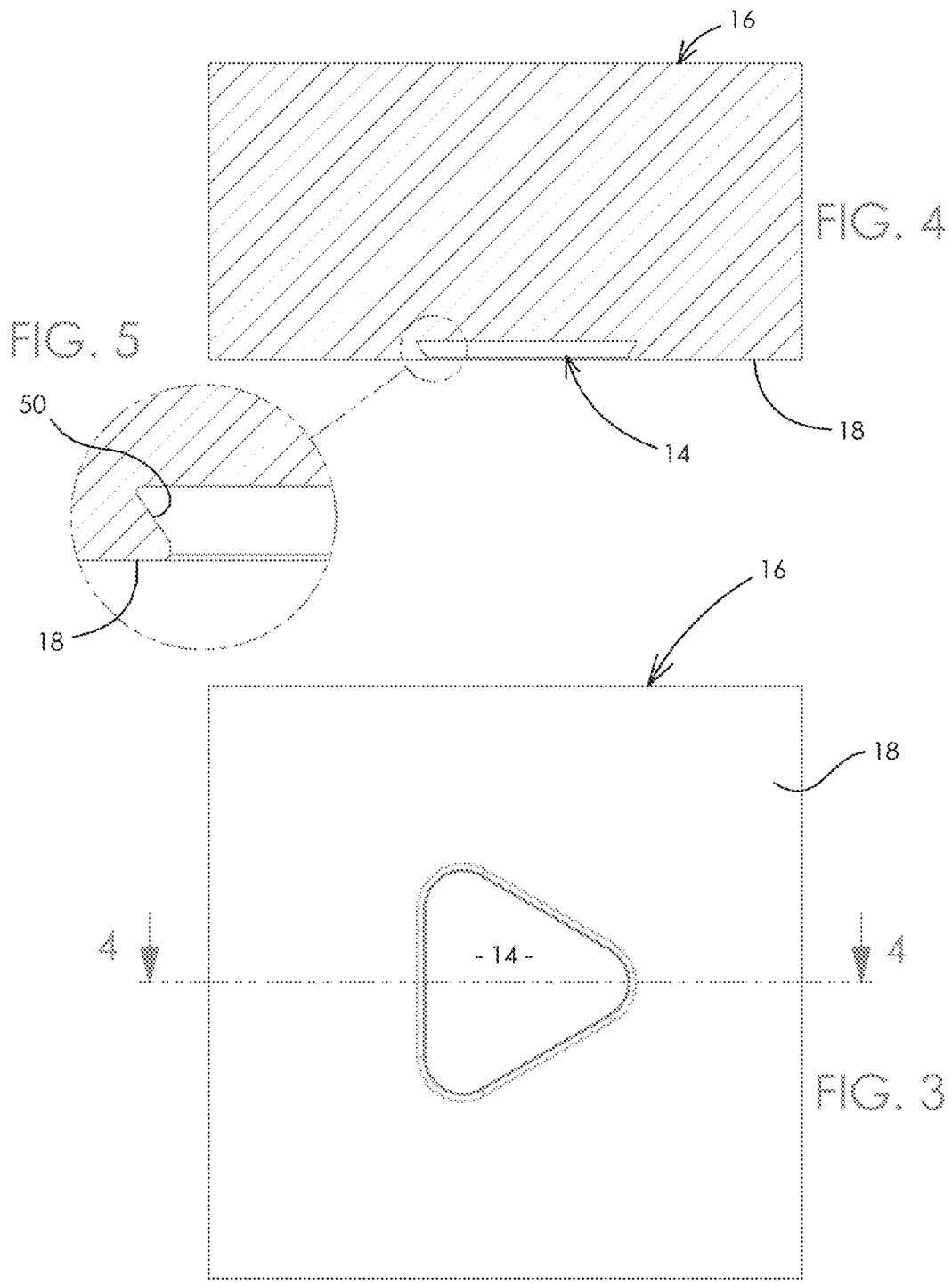

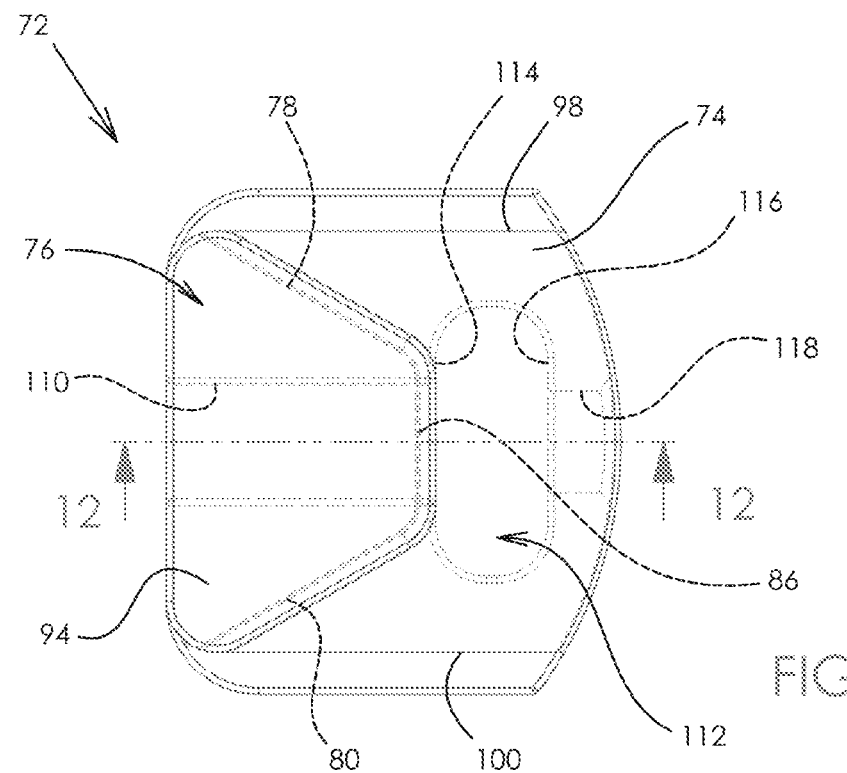
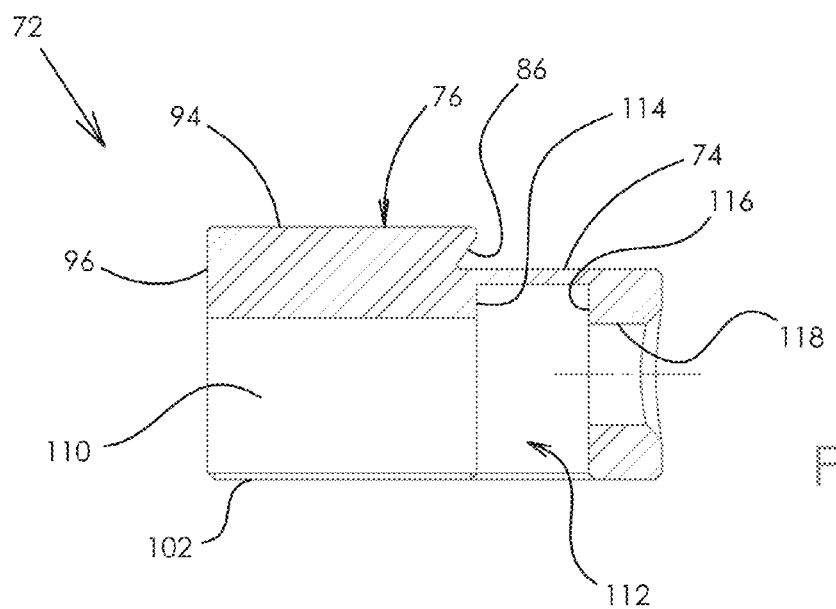

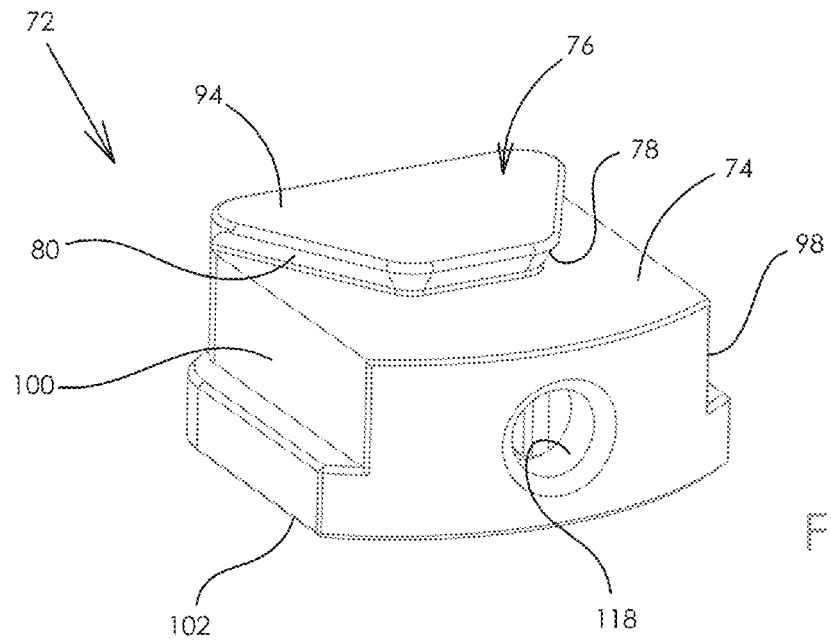
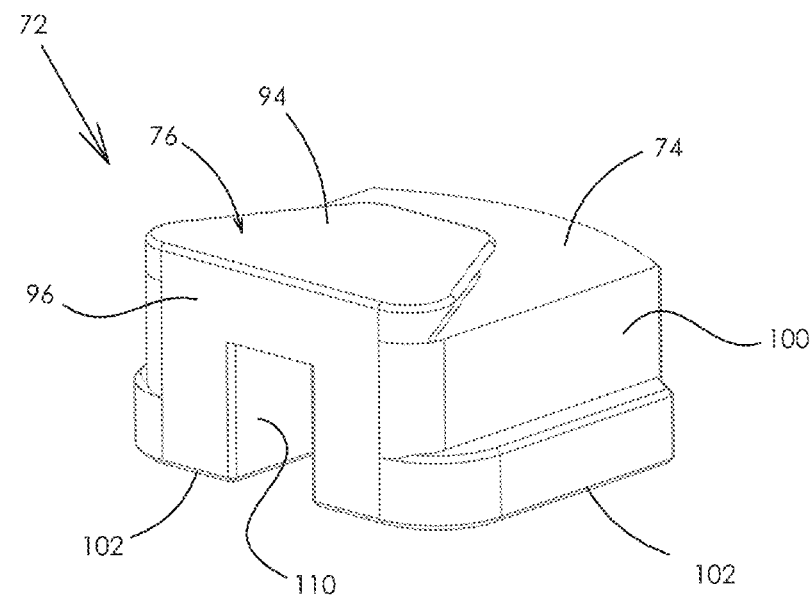

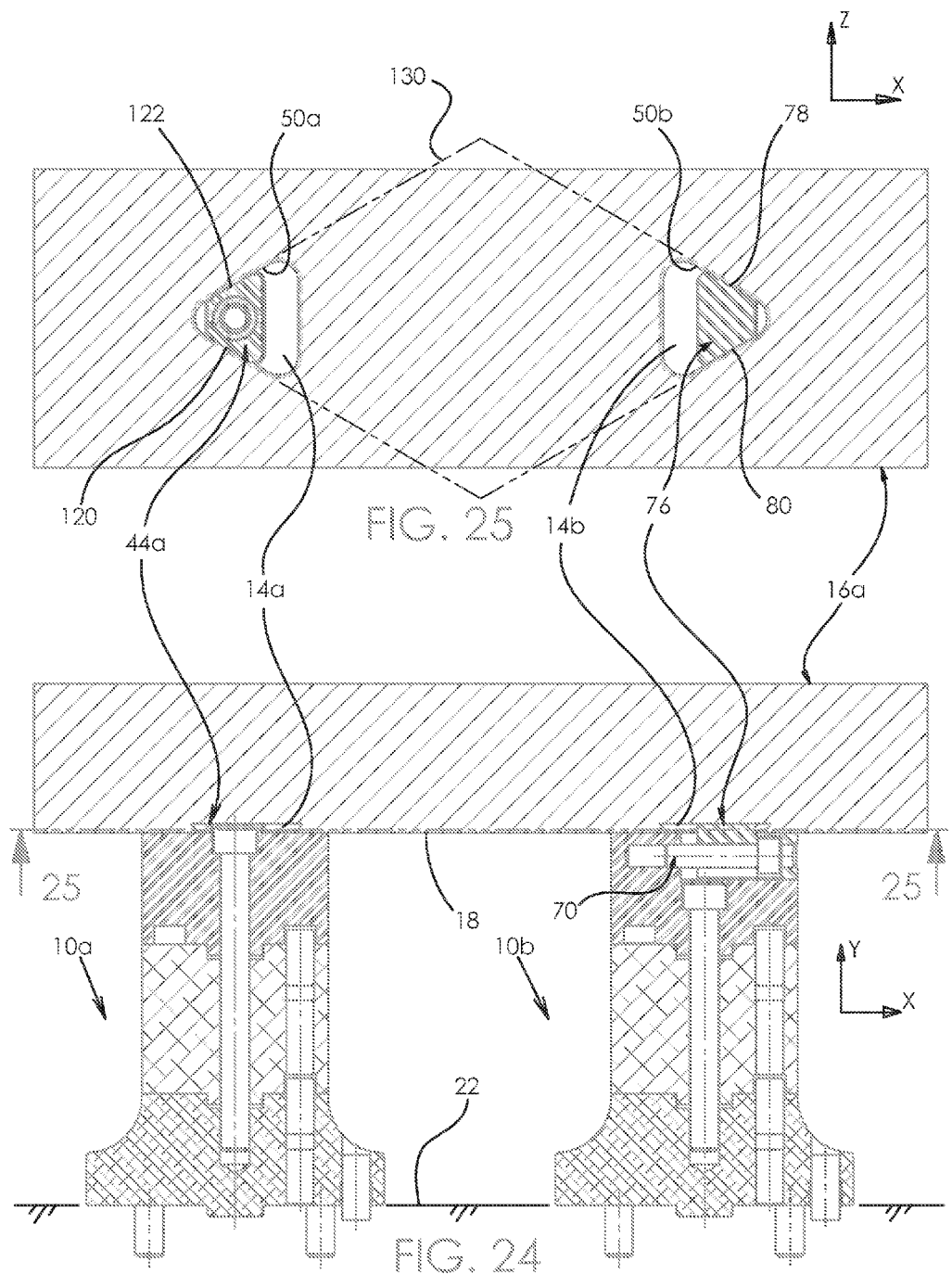

WORKPIECE HOLDER

FIELD OF THE INVENTION

The present invention is generally directed to a workpiece holder; in particular, the workpiece holder includes a clamping assembly having contact surfaces that are configured for being selectively engaged within a recess formed in a workpiece for securely mounting the workpiece to the workpiece holder along x, y and z axes.

BACKGROUND OF THE INVENTION

When machining a workpiece using an automated multi-axis machining tool, such as a computer numerical control (CNC) machine tool, it is necessary to keep the workpiece fixed relative to a reference point so that the workpiece can be cut, milled, or otherwise formed with accuracy. If the workpiece is not fixed relative to a reference point during the machining process, the resulting product will likely be formed outside of specifications, and the CNC machine tool may be subject to an increased risk of crashing, which could result in damage to the cutting tool and other components of the tool.

In order to fix the position of the workpiece relative to a reference point during the machine process, it is common to mount the workpiece to a prior art workpiece holder. Prior to mounting a workpiece to an existing workpiece holder, a pair of dovetail grooves are typically machined in opposite external edges of a bottom portion of the workpiece. The dovetail grooves provide a pair of opposing surfaces that form a single male protrusion on the workpiece that allow the workpiece holder to grip the workpiece along the x and y axes using a pair of opposing clamping members. The clamping members can either be mechanically actuated to move toward one another to grip the dovetail grooves, or one of the clamping members may be fixed in a stationary position while the other clamping member is moved toward the stationary clamping member to grip the dovetail grooves. After the workpiece is formed by the CNC machining tool, the dovetail grooves (i.e., the single male protrusion) are machined off.

While existing workpiece holders are capable of maintaining the workpiece in a fixed position along the x and y axes relative to a reference point, they suffer from a number of drawbacks and deficiencies that introduce a number of inefficiencies into the machining process. For example, existing workpiece holders may include a spring that is used to bias one of the clamp members in a direction that assists in disengaging the clamp member from the dovetail groove. However, the moveable clamp member is susceptible to binding within the body of the workpiece holder when disengaging from the dovetail groove due to the forces imposed by the moment arm created between the clamp screw and the actual clamp contact area of the workpiece and associated distance away. This offset distance or moment arm may cause a bind that the spring cannot overcome. When the workpiece cannot be easily released from the workpiece holder, this causes delays in manufacturing the workpiece. Further inefficiencies are present at the beginning of the machining process due to the need to machine two separate dovetail grooves in opposite external edges of the bottom portion of the workpiece, and also after the machining process is complete when the entire bottom surface of the workpiece needs to be machined off to remove the dovetail grooves. Additionally, even though the workpiece holder operates to restrict the movement of the workpiece along the x and y axes, one or more separate indexing features are also typically included to properly orient the workpiece to the workpiece holder and prevent movement of the workpiece along the z axis, which is perpendicular to both the x and y axes. However, using the indexing feature to properly position the workpiece introduces an additional step and a further inefficiency in the machining process. Furthermore, the prior art has limitations to the clamping forces it may apply on the workpiece due to only clamping in one direction and using a indexing feature in the other.

As such, there is a need for a workpiece holder that is not susceptible to binding when releasing a workpiece from the workpiece holder. There is also a need to reduce the amount of machining that needs to be done on a workpiece in order for the workpiece to be mounted to the workpiece holder. There is a further need for a workpiece holder with a clamping mechanism that restricts movement of workpiece along the x, y and z axes without the need for a separate indexing feature. The present invention addresses these and other needs, such as the benefit of higher clamping forces in multiple directions.

SUMMARY OF THE INVENTION

In general, the present invention is directed to a workpiece holder including a clamping assembly having contact surfaces that are configured for being selectively engaged within a recess formed in a mounting surface of a workpiece for securely mounting the workpiece to the workpiece holder along x, y and z axes. The workpiece holder comprises a stationary base clamp including a first portion of the clamping assembly, a clamp dog including a second portion of the clamping assembly, and an adjustment mechanism operatively connected to the stationary base clamp and the clamp dog to selectively move the first and second portions of the clamping assembly between a clamped position and a release position.

In one aspect of the present invention, the stationary base clamp includes a first top surface and a first protrusion extending from the first top surface, wherein the first protrusion includes a first contact surface positioned at a first acute angle relative to the first top surface. The first protrusion represents at least a part of the first portion of the clamping assembly. The stationary base clamp has a partial slot defined in the first top surface. Further, a threaded bore is defined in the stationary base clamp. The clamp dog is configured for being slidably disposed within the partial slot, and includes a second top surface and a second bottom surface. A second protrusion extends from the second top surface and includes a second contact surface. The second contact surface is positioned at a second acute angle relative to the second top surface. The second protrusion represents at least a part of the second portion of the clamping assembly. A channel is defined in the second bottom surface and defines a pair of opposing stop surfaces. The clamp dog has an access opening defined therein that extends into the channel. The adjustment mechanism may include a bolt having a head and a shank, wherein the threaded bore defined in the stationary base clamp is configured for receiving a threaded portion of the shank. The threaded portion of the shank may be a left-handed thread orientation to prevent the bolt from inadvertently backing out of the threaded bore. The channel defined in the clamp dog is configured for receiving the head and a portion of the shank, wherein the pair of opposing stop surfaces are configured for contacting the head of the bolt to maintain the lateral position of the bolt relative to the clamp dog. The access opening defined in the clamp dog is positioned to provide access to the head when the bolt is positioned in the channel. The adjustment mechanism is configured to move the second protrusion away from the first protrusion to the clamped position by rotating the bolt so that the first and second contact surfaces engage a dovetail wall of the recess to secure the workpiece to the workpiece holder along the x, y and z directions. In one aspect of the invention, at least one of the first and second contact surfaces may be non-linear, such as, for example, semi-circular shaped, W-shaped, or other shape. In another aspect of the invention, one of the first and second protrusions may include a third contact surface, wherein the first, second, and third contact surfaces extend endwise along first, second, and third longitudinal axes, respectively, and wherein the first, second, and third longitudinal axes are disposed at acute angles relative to one another to properly index the workpiece relative to the workpiece holder. For example, the first, second, and third longitudinal axes may be disposed at sixty degree angles relative to one another.

In another aspect of the present invention, the partial slot defined in the stationary base clamp may be defined by a first shoulder, a first pair of opposing stepped side surfaces, and a first bottom surface, wherein the first bottom surface extends between the first pair of opposing stepped side surfaces. For example, the partial slot may have a T-shaped cross-section. Further, the clamp dog may include a second shoulder, a second pair of stepped opposing sidewalls, and a second bottom surface disposed between the second pair of opposing stepped side surfaces. The first pair of stepped opposing sidewalls and first bottom wall are configured to receive the second pair of stepped opposing sidewalls and the second bottom wall to provide a containment track for the clamp dog to precisely slide within the partial slot when moving between the clamp and release positions.

In yet another aspect of the present invention, a system for selectively mounting a workpiece relative to a support surface along x, y and z axes is provided. The workpiece has at least one recess defined in a mounting surface, wherein the recess includes a dovetail wall. The system includes a first workpiece holder including a first top surface and a first protrusion extending from the first top surface. The first protrusion includes a first contact surface positioned at a first acute angle relative to the first top surface, and the first protrusion is fixedly positioned relative to the first top surface. The system also includes a second workpiece holder having a second top surface, a partial slot defined in the second top surface, and a clamp dog configured for being slidably disposed within the partial slot. The clamp dog includes a third top surface and a second protrusion extending from the third top surface. The second protrusion includes a second contact surface that is positioned at a second acute angle relative to the third top surface. An adjustment mechanism is operatively connected with the first workpiece holder and the clamp dog to selectively move the clamp dog between a clamped position and a release position. The adjustment mechanism is configured to move the second protrusion away from the first protrusion to the clamped position so that the first and second contact surfaces engage the dovetail wall of the at least one recess to secure the workpiece to the first and second workpiece holders along the x, y and z axes. Another aspect of the present invention utilizes multiple systems, as described above, to secure a workpiece relative to a support surface.

Additional objects, advantages and novel features of the present invention will be set forth in part in the description which follows, and will in part become apparent to those in the practice of the invention, when considered with the attached figures.

BRIEF DESCRIPTION OF THE DRAWINGS

The accompanying drawings form a part of this specification and are to be read in conjunction therewith, wherein like reference numerals are employed to indicate like parts in the various views, and wherein:

FIG. 3 is a bottom view of the workpiece showing a recess formed in an interior portion of a bottom mounting surface of the workpiece;

FIG. 4 is a cross-sectional view taken along line 4-4 in FIG. 3;

FIG. 5 is an enlarged view of a portion of FIG. 4 showing a dovetail wall formed in the recess of the workpiece;

FIG. 11 is a top view of a clamp dog in accordance with one aspect of the present invention;

FIG. 12 is a cross-sectional view of the clamp dog taken along line 12-12 in FIG. 11;

FIG. 13 is a front perspective view of the clamp dog shown in FIG. 11;

FIG. 14 is a rear perspective view of the clamp dog shown in FIG. 11;

FIG. 24 is a cross-sectional view taken long line 24-24 in FIG. 23 showing the system in a clamp position engaging a workpiece;

FIG. 25 is a cross-sectional view taken along line 25-25 in FIG. 24; and

DETAILED DESCRIPTION OF THE DRAWINGS

Figure 1:
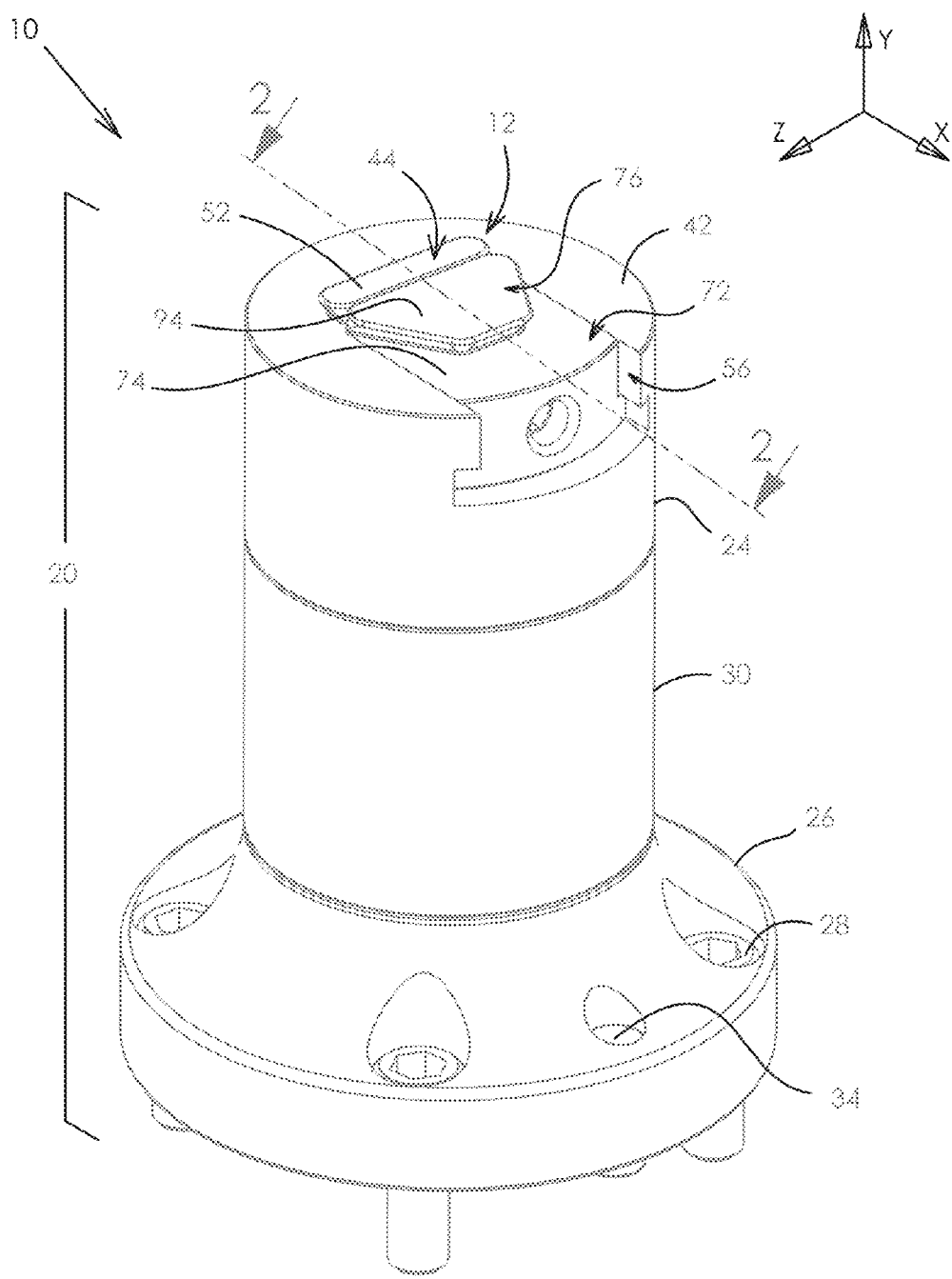
FIG. 1 is a perspective view of a workpiece holder according to one aspect of the present invention.

Referring to the drawings in detail, and specifically to FIGS. 1, 2, 6 and 8, a workpiece holder according to one aspect of the present invention is generally designated as reference numeral 10. Workpiece holder 10 may include a three-sided clamping assembly 12 that is configured for being positively engaged within a recess 14 formed in a workpiece 16 for securely mounting workpiece 16 to workpiece holder 10 along the x, y and z axes. The recess 14 is formed in an interior portion of a bottom mounting surface 18 of workpiece 16. As will be described in more detail below, the design of workpiece holder 10 does not require the use of any springs or other mechanical devices that would cause workpiece holder 10 to bind during operation. Furthermore, the three-sided clamping assembly 12 not only serves to securely mount workpiece 16 to workpiece holder 10, but also properly indexes workpiece 16 relative to workpiece holder 10 without the need for a separate indexing feature.

With continued reference to FIGS. 1, 2, 6 and 8, workpiece holder 10 includes a stationary base clamp 20 that is configured for being securely mounted to a support surface 22, such as a mounting location on a CNC machine tool. In particular, stationary base clamp 20 may include a clamp head 24 and a riser base 26 that is adapted to be securely mounted to support surface 22 using one or more mounting bolts 28. Stationary base clamp 20 may also include an extension member 30 positioned between riser base 26 and clamp head 24 to properly set the distance of clamp head 24 relative to support surface 22. One or more alignment pins 32 may be used to properly orient clamp head 24, riser base 26, and extension member 30 prior to securely fastening these components relative to one another. Also, one or more alignment pins 34 may be used to properly position riser base 26 relative to support surface 22. A common bolt opening 36 may be formed in clamp head 24, riser base 26, and extension member 30 along a longitudinal axis 38 of stationary base clamp 20. Bolt opening 36 is configured for receiving an assembly bolt 40 to secure clamp head 24, riser base 26, and extension member 30 to one another.

As best seen in FIGS. 15-18, clamp head 24 includes a top surface 42 adapted to be positioned adjacent to bottom mounting surface 18 of workpiece 16 when mounted to workpiece holder 10. A first portion of clamping assembly 12 includes a first protrusion 44 extending from top surface 42, wherein first protrusion 44 includes a first contact surface 46 positioned at an acute angle 48 (FIG. 16) relative to top surface 42. First contact surface 46 is configured for engaging a dovetail wall 50 (FIG. 5) that defines recess 14 in workpiece 16. Protrusion 44 may further include an upper wall 52 that is parallel with top surface 42, and a shoulder 54 that is perpendicular to top surface 42.

Figure 17:
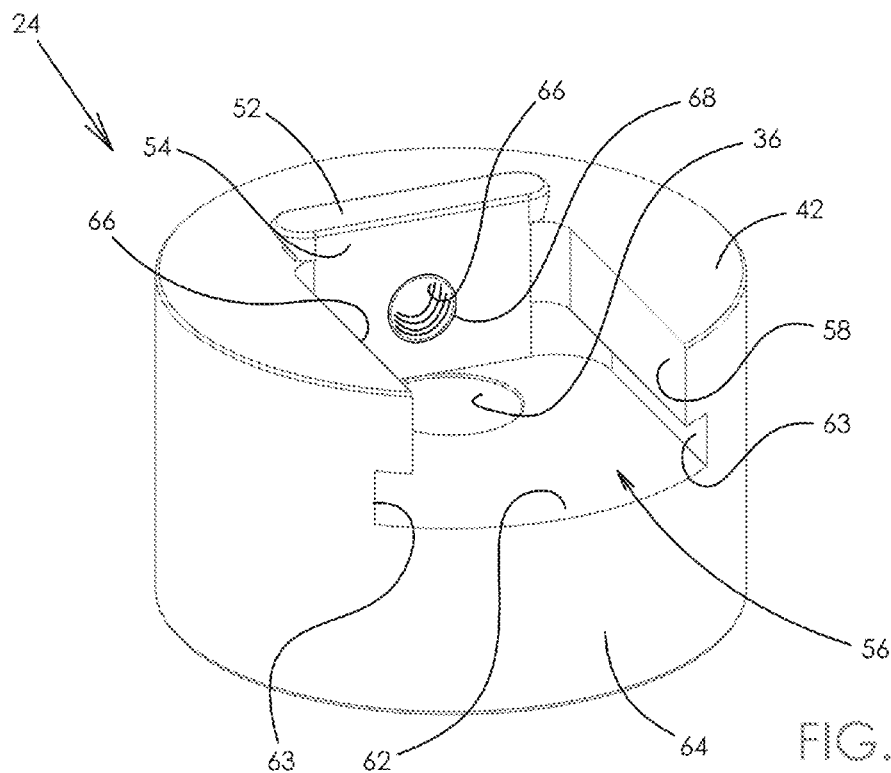
FIG. 17 is a front perspective view of the clamp head shown in FIG. 15.
Figure 18:
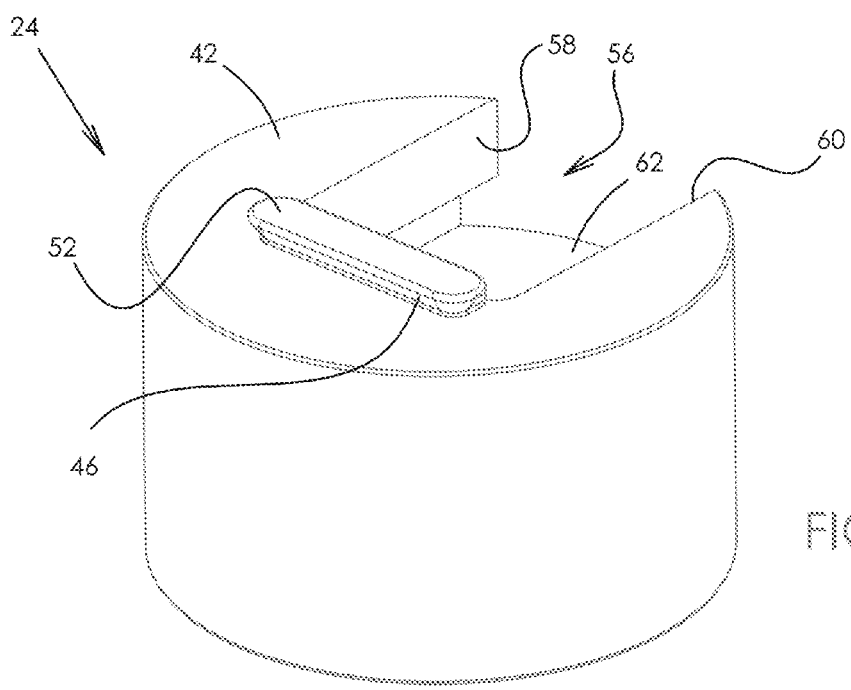
FIG. 18 is a rear perspective view of the clamp head shown in FIG. 17.

In addition, clamp head 24 has a partial slot 56 defined in the top surface 42 that extends in a direction that is transverse to longitudinal axis 38 of stationary base clamp 20. Partial slot 56 is defined by shoulder 54, a pair of opposing side walls 58, 60, and a bottom wall 62, wherein bottom wall 62 extends between side walls 58, 60. In one aspect of the invention, partial slot 56 may have a T-shaped cross-section, or another cross-sectional configuration, that provides one or more squared or rounded notches 63 formed in one or both side walls 58, 60. For example, as best seen in FIG. 17, side walls 58, 60 are both stepped so that the width of partial slot 56 is greater toward bottom wall 62 compared to the width of partial slot 56 adjacent to top surface 42. It should be understood that partial slot 56 does not extend all the way through clamp head 24, but instead extends from an outer surface 64 of clamp head 24, partially through clamp head, and terminates at shoulder 54. Further, a threaded bore 66 is formed in clamp head 24, wherein a distal end 68 of bore 66 is defined in shoulder 54 and adapted to be operatively connected with an adjustment mechanism 70, which will be described in more detail below.

As best seen in FIGS. 1 and 11-14, workpiece holder 10 further includes a clamp dog 72 configured for being slidably disposed within partial slot 56 of clamp head 24. Clamp dog 72 includes a top surface 74 adapted to be positioned adjacent to bottom mounting surface 18 of workpiece 16 when mounted to workpiece holder 10. As best seen in FIG. 1, top surface 74 of clamp dog 72 may also be coextensive with top surface 42 when clamp dog 72 is slidably disposed within partial slot 56 so that top surfaces 42, 74 form a uniform surface upon which workpiece 16 may rest upon when mounting workpiece 16 to workpiece holder 10. A second portion of clamping assembly 12 includes a second protrusion 76 extending from top surface 74, wherein second protrusion 76 includes a second contact surface 78 and a third contact surface 80 that are configured for engaging dovetail wall 50 (FIG. 5) in workpiece 16. Second contact surface 78 is positioned at an acute angle 82 relative to top surface 74 and third contact surface 80 is positioned at an acute angle (not shown) relative to top surface 74. While second and third contact surfaces 78, 80 are joined by a connecting wall 86, it should be understood that such an arrangement where second and third contact surfaces 78, 80 intersect with one another is contemplated. It should be understood that the value of each of the aforementioned acute angles may all be equal to one another, may all be different than one another, or two of the aforementioned acute angles may have values that are equal to one another and different than the value of the other acute angle.

Figure 10:
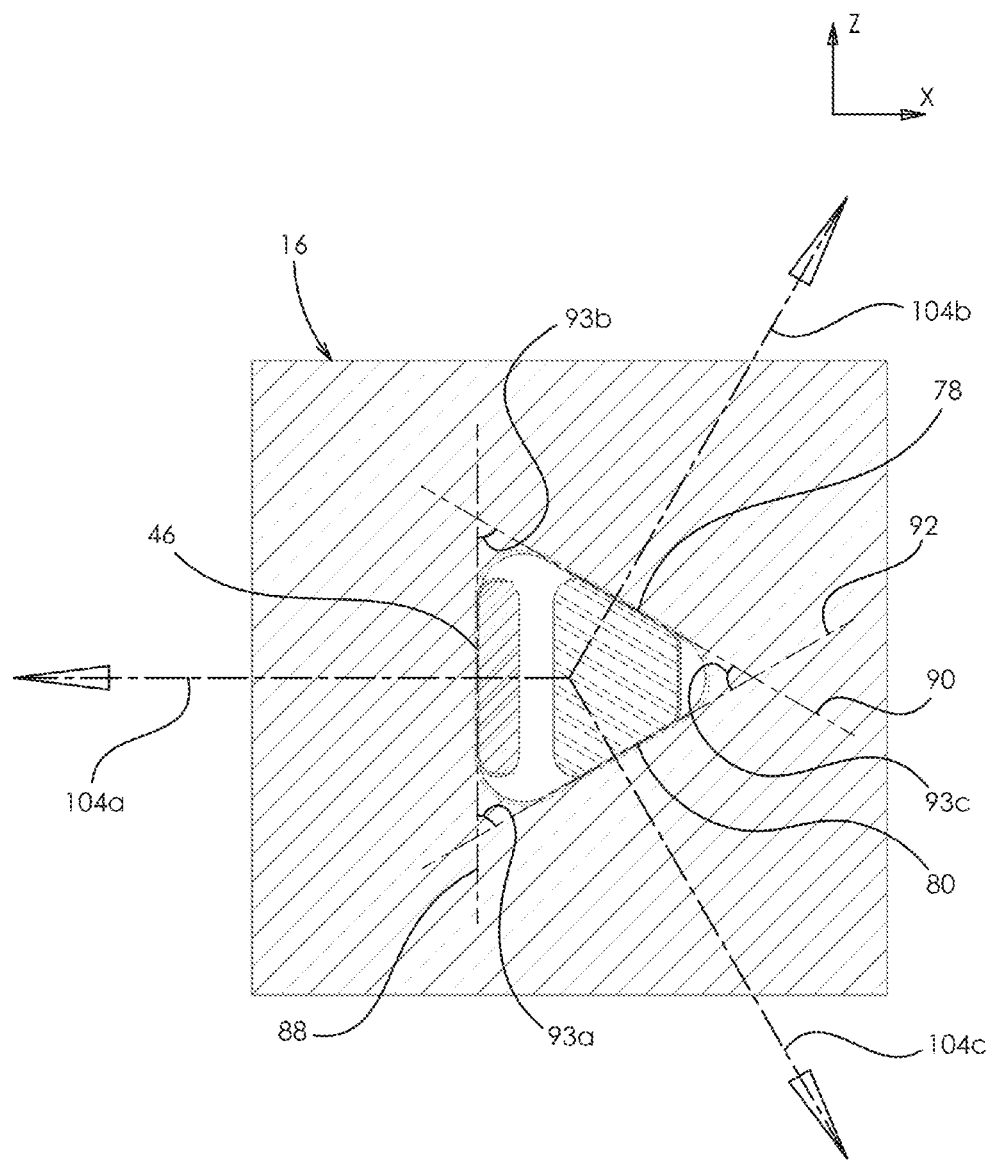
FIG. 10 is a cross-sectional view taken along line 10-10 in FIG. 8 showing the force vectors imposed on workpiece by the clamping assembly of the workpiece holder.
Figure 15:
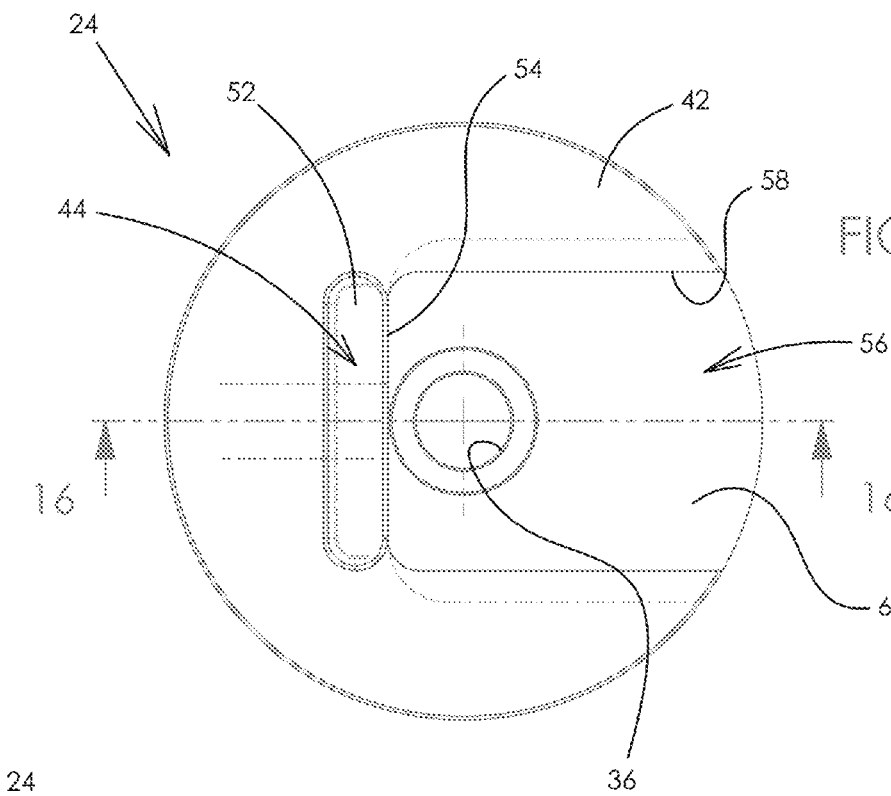
FIG. 15 is a top view of a clamp head in accordance with one aspect of the present invention.
Figure 16:
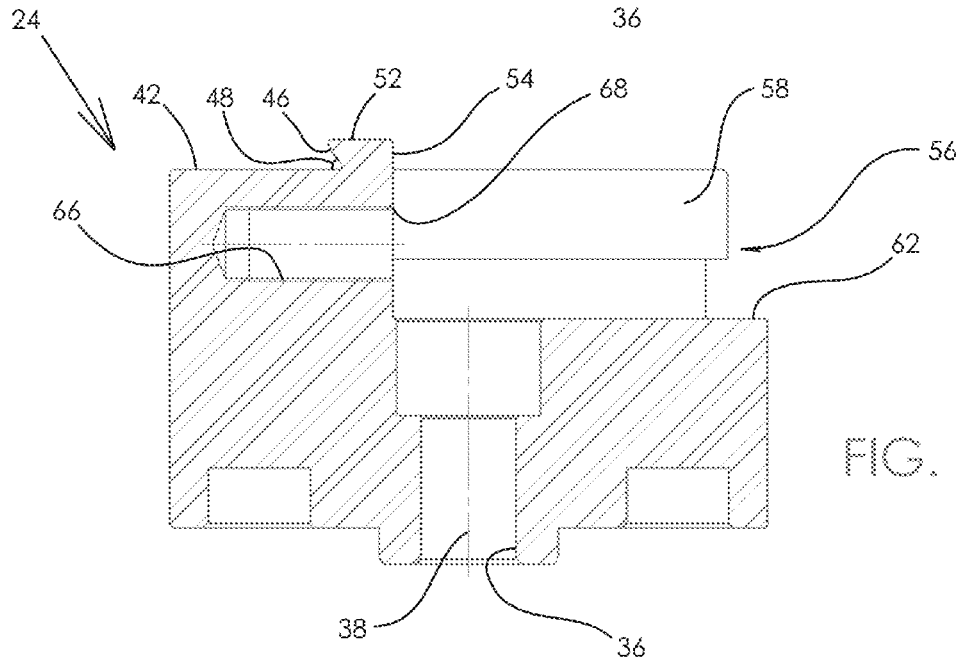
FIG. 16 is a cross-sectional view of the clamp head taken along line 16-16 in FIG. 15.

As best seen in FIG. 10, each of first, second, and third contact surfaces 46, 78, 80 extend endwise or linearly along first, second, and third longitudinal axes 88, 90, 92, respectively. In accordance with one aspect of the present invention, first, second, and third longitudinal axes 88, 90, 92 may be disposed at angles 93a, 93b, 93c relative to one another to form a triangular-shaped clamping assembly. For example, first, second, and third longitudinal axes 88, 90, 92 may be disposed at sixty degree angles relative to one another. In another example, the angles formed between longitudinal axes 88, 90, 92 are such that a right triangle is formed, whereby one of the angles is ninety degrees and the other two angles are forty-five degrees. In yet another example, the angles formed between longitudinal axes 88, 90, 92 may all be different values. By disposing first, second, and third longitudinal axes 88, 90, 92 at angles relative to each other as shown and described, workpiece 16 is indexed relative to workpiece holder 10 along the x and z axes as workpiece 16 is clamped to workpiece holder 16 by clamping assembly 12. Thus, the arrangement of first, second, and third contact surfaces 46, 78, 80 eliminates the need for a indexing feature that is separate from clamping assembly 12, while at the same time securely mounting workpiece 16 to workpiece holder 10.

As best seen in FIGS. 1 and 11-14, second protrusion 76 may further include an upper wall 94 that is parallel with top surface 74 and coextensive with upper wall 52 of first protrusion 44. Clamp dog 72 further includes a shoulder 96, a pair of opposing side walls 98, 100, and a bottom wall 102 disposed between side walls 98, 100. Shoulder 96 may extend perpendicularly from top surfaces 42, 74, and may be adapted to contact shoulder 54 of clamp head 24 when workpiece holder 10 is in a release position. In accordance with another aspect of the present invention, side walls 98, 100 and bottom wall 102 are configured to be slidably received within the partial slot 56 defined by side walls 58, 60 and bottom wall 62.

For example, if side walls 58, 60 include a stepped configuration to form a T-shaped cross-section, as shown in FIG. 17, then side walls 98, 100 are also stepped to match the configuration of side walls 58, 60, and bottom walls 62, 102 are configured to be slidably disposed relative to one another. As a result, side walls 58, 60 and bottom wall 62 of partial slot 56 serve as a track for clamp dog 72 to slide within when moving between the clamped position (FIG. 9) and the release position (FIG. 7) relative to clamp head 24.

Figure 2:
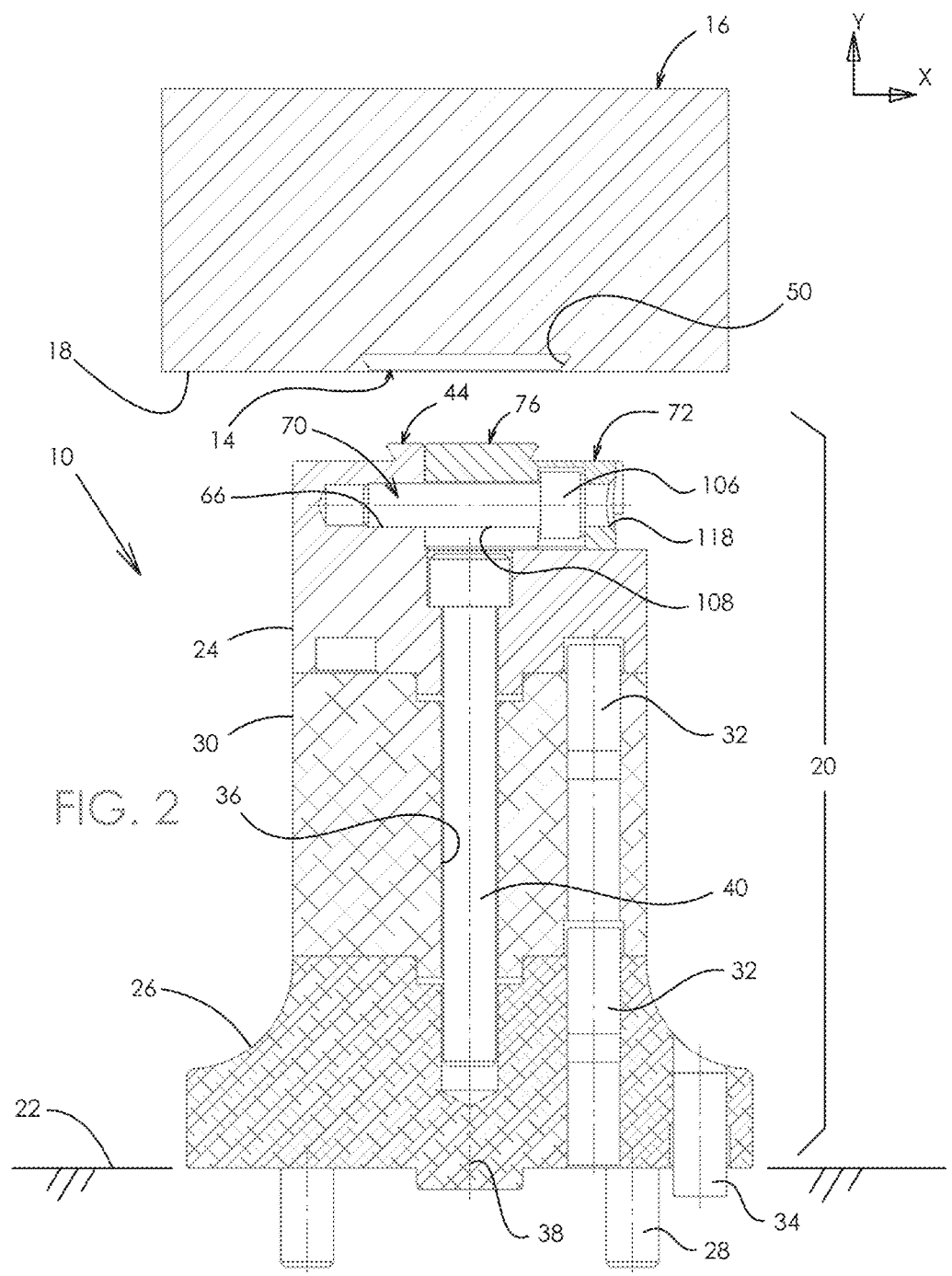
FIG. 2 is a cross-sectional view taken along line 2-2 in FIG. 1 showing the workpiece holder in a release position, and a cross-sectional view of a workpiece to be engaged by the workpiece holder.
Figure 8:
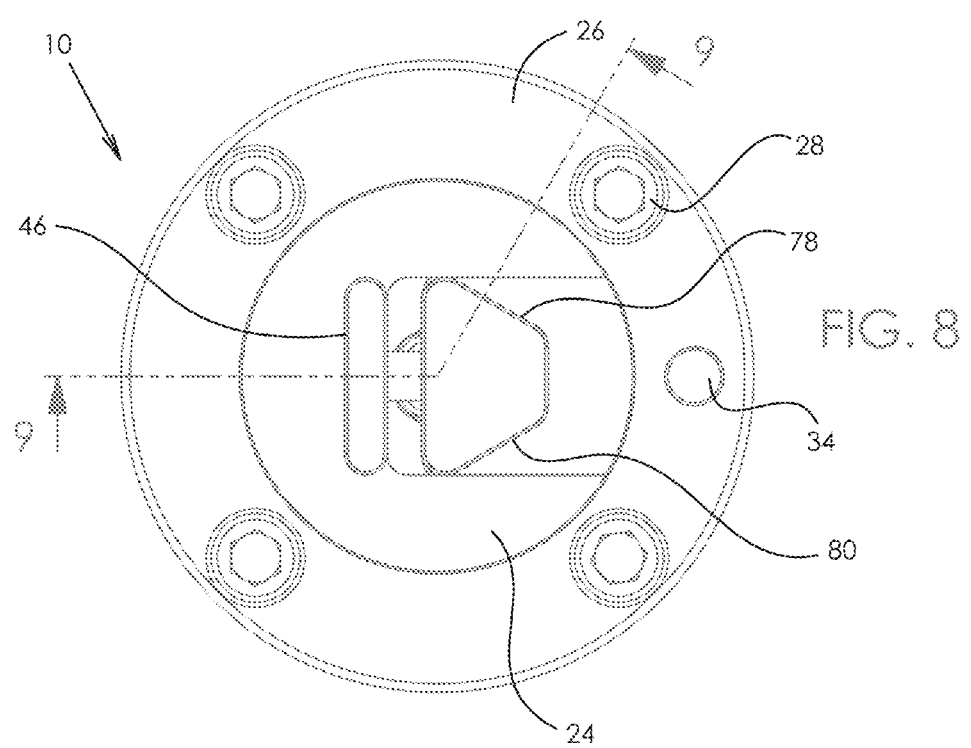
FIG. 8 is a top view of the workpiece holder similar to FIG. 6, wherein the workpiece holder is in a clamped position.
Figure 9:
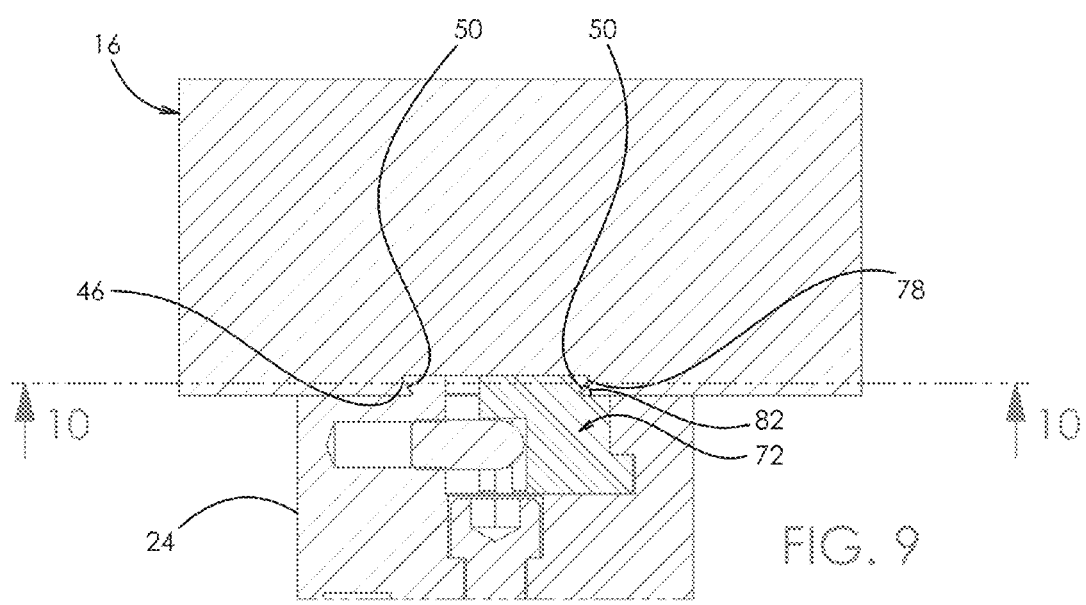
FIG. 9 is a partial cross-sectional view taken along line 9-9 in FIG. 8 showing of the workpiece placed on a top surface of the workpiece holder, wherein the workpiece holder is engaged with the workpiece in the x, y and z directions.

As best seen in FIG. 2, workpiece holder 10 further includes adjustment mechanism 70 operatively connected with stationary base clamp 20 and clamp dog 72 to selectively move workpiece holder 10 between the clamped position and the release position. In particular, adjustment mechanism 70 is configured to move second protrusion 76 away from first protrusion 44 to the clamped position so that the first, second, and third contact surfaces 46, 78, 80 engage dovetail wall 50 of recess 14 to mount workpiece 16 to workpiece holder 10, as best seen in FIGS. 8 and 9.

Referring back to FIG. 2, adjustment mechanism 70 may include a bolt having a head 106 and a shank 108, wherein a threaded end portion of shank 108 is configured for being received within threaded bore 66 formed in clamp head 24. With additional reference to FIGS. 11, 12 and 14, clamp dog 72 includes a channel 110 defined in its bottom wall 102 for receiving an upper portion of shank 108. Channel 110 further includes an enlarged section 112 that is configured for securely receiving head 106. Enlarged section 112 includes a pair of opposing stop surfaces 114, 116 that contact opposing sides of head 106 to maintain the lateral position of adjustment mechanism 70 relative to clamp dog 72. As best seen in FIGS. 2 and 11-13, an access opening 118 is defined in clamp dog 72 and extends into enlarged portion 112 of channel 110 to provide access to head 106 when adjustment mechanism 70 is positioned in channel 110 to allow for the selective movement of clamp dog 72 relative to clamp head 24 between the clamped position and the release position. The threaded portion of shank 108 may be configured with a left-handed thread orientation so that clockwise rotation of adjustment mechanism 70 results in adjustment mechanism 70 backing out of bore 66. Providing a left-handed thread orientation prevents adjustment mechanism 70 from inadvertently backing out of threaded bore 66.

In assembling workpiece holder 10, the riser base 26, extension member 30, and clamp head 24 are aligned with one another using alignment pins 32, 34 and then securely fastened to each other using assembly bolt 38. Further, riser base 26 is mounted to support surface 22 using one or more mounting bolts 28. Adjustment mechanism 70 is inserted in channel 110 so that head 106 is positioned in enlarged section 112, adjacent to opposing stop surfaces 114, 116, and accessible through access opening 118. The upper portion of shank 108 is positioned in channel 110, and the threaded end portion of shank 108 extends outwardly a distance beyond shoulder 96 of clamp dog 72. Clamp dog 72 is then slid within partial slot 56 so that side walls 58, 60 and bottom wall 62 are adjacent to side walls 98, 100 and bottom wall 102. The threaded end portion of shank 108 is then threadably coupled with threaded bore 66.

Figure 6:
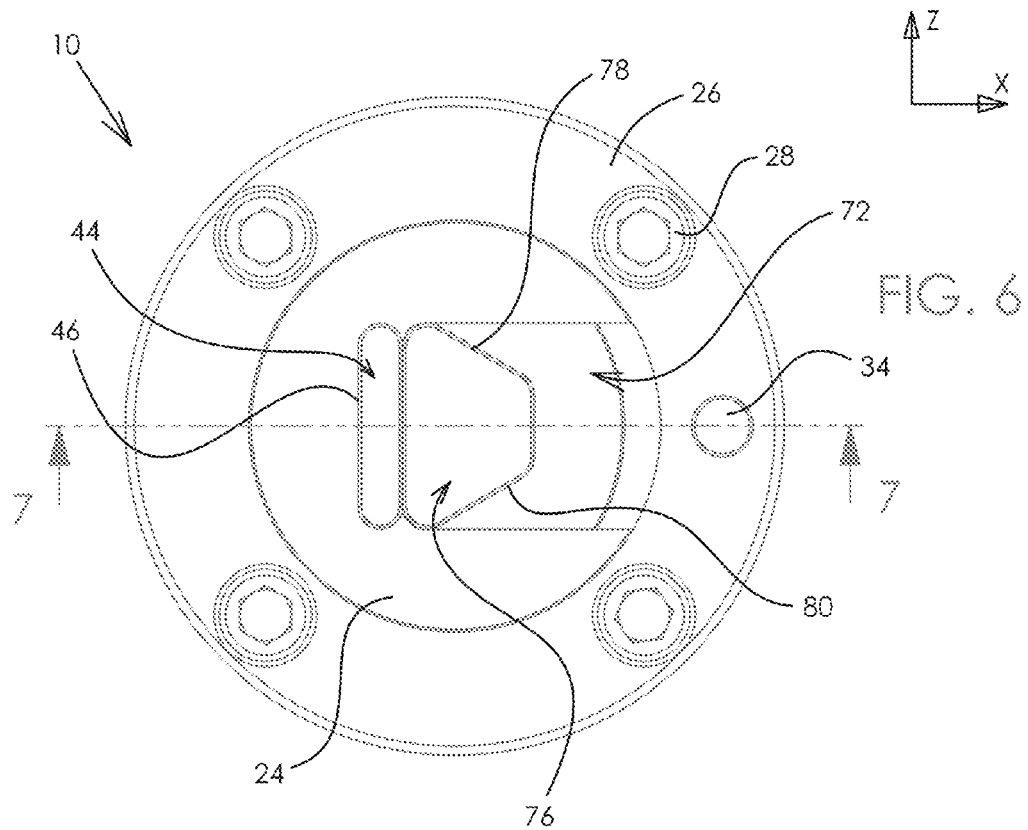
FIG. 6 is a top view of the workpiece holder shown in FIG. 1 in the release position.
Figure 7:
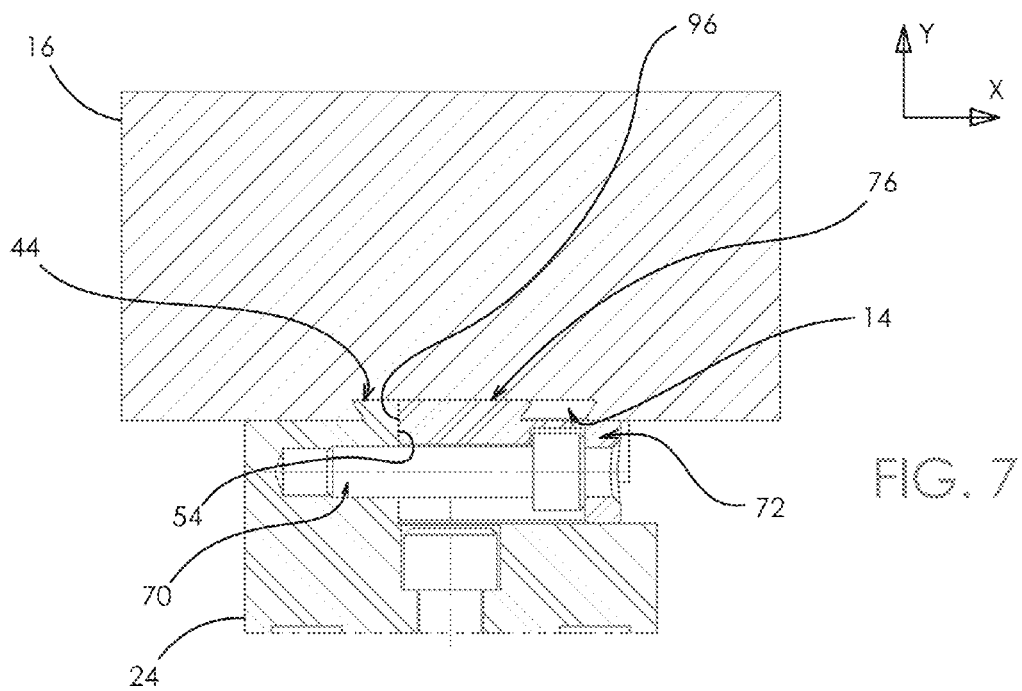
FIG. 7 is a partial cross-sectional view taken along line 7-7 in FIG. 6 showing of the workpiece placed on a top surface of the workpiece holder, wherein the workpiece holder is not fully engaged with the workpiece.

In operation, shank 108 is rotated so that second protrusion 76 on clamp dog 72 is moved toward first protrusion 44 to the release position shown in FIGS. 6 and 7. If a left-handed thread orientation is used on shank 108, then counter-clockwise rotation of adjustment mechanism 70 will result in moving second protrusion 76 toward first protrusion 44. Clamp dog 72 may be moved to a position where shoulders 54, 96 are in contact with one another. As clamp dog 72 is moving within partial slot 56, adjustment mechanism 70 is retained within the workpiece holder 10 by channel 110 and bottom wall 62 of clamp head 24. After workpiece holder 10 is moved to the release position, workpiece 16 may be positioned on workpiece holder 10 by placing first and second protrusions 44, 76 within recess 14 defined in workpiece 16, as seen in FIG. 7. Adjustment mechanism 70 is then rotated so that first and second protrusions 44, 76 move away from each other toward the clamped position shown in FIGS. 8 and 9. In the clamped position, first, second and third contact surfaces 46, 78, 80 are engaged with dovetail wall 50 of recess 14 to prevent workpiece 16 from moving along the x, y and z axes relative to workpiece holder 10. In particular, as best seen in FIG. 10, first, second and third contact surfaces 46, 78, 80 impose perpendicular forces 104a, 104b, 104c, respectively, on opposing walls of dovetail wall 50 that secure workpiece 14 to workpiece holder 10. Force 104a is directed along the x axis in one direction, and both forces 104b and 104c include force components that are directed along the x axis in a direction that opposes force 104a. Forces 104b and 104c both include force components that are directed in opposite directions along the z axis. Furthermore, as best seen in FIG. 9, the angled orientation of the first, second and third contact surfaces 46, 78, 80 relative to the respective top surfaces 42, 74 operate to prevent workpiece 16 from being moved along the y axis and disengaged from workpiece holder 10 when in the clamped position. In accordance with the present invention, workpiece 16 is secured and fixed along the x, y and z axes relative to a reference point, which allows workpiece 16 to be machined using a CNC machining tool or other type of machining tool that requires the use of a workpiece holder. To remove the workpiece 16 from workpiece holder 10 after machining operations are complete, adjustment mechanism 70 is rotated so that the second protrusion 76 is moved toward first protrusion 44 until workpiece holder 10 is in the release position shown in FIG. 7, wherein workpiece 16 may then be removed from workpiece holder 10. Mounting surface 18 on workpiece 16 may then be machined off to remove recess 14 and complete the finished product from workpiece 16.

By constructing a workpiece holder as described above, numerous advantages are realized. For example, providing a clamping assembly including three contact surfaces that are disposed at acute angles relative to one another operates to restrict the movement of a workpiece along the x, y and z axes without the need for a separate indexing feature. Furthermore, the workpiece holder described above does not include any springs or provide an arrangement that is susceptible to binding when moving between clamped and release positions. Also, the T-shaped partial slot provides a precise tracking mechanism for the clamp dog as it slides between clamped and release positions. Moreover, providing a clamping mechanism that positively engages a recess formed in an interior portion of a bottom surface of the workpiece, in some machining applications, may reduce the amount of machining that needs to be done on a workpiece in order to produce a finished product. This is because the recess formed in the present invention in order to clamp the workpiece to the workpiece holder, in some applications, will need to be removed anyway to form the finished product (such as a pocket or other feature that is part of the finished workpiece), so no additional material would need to be removed from the workpiece.

Figure 19:
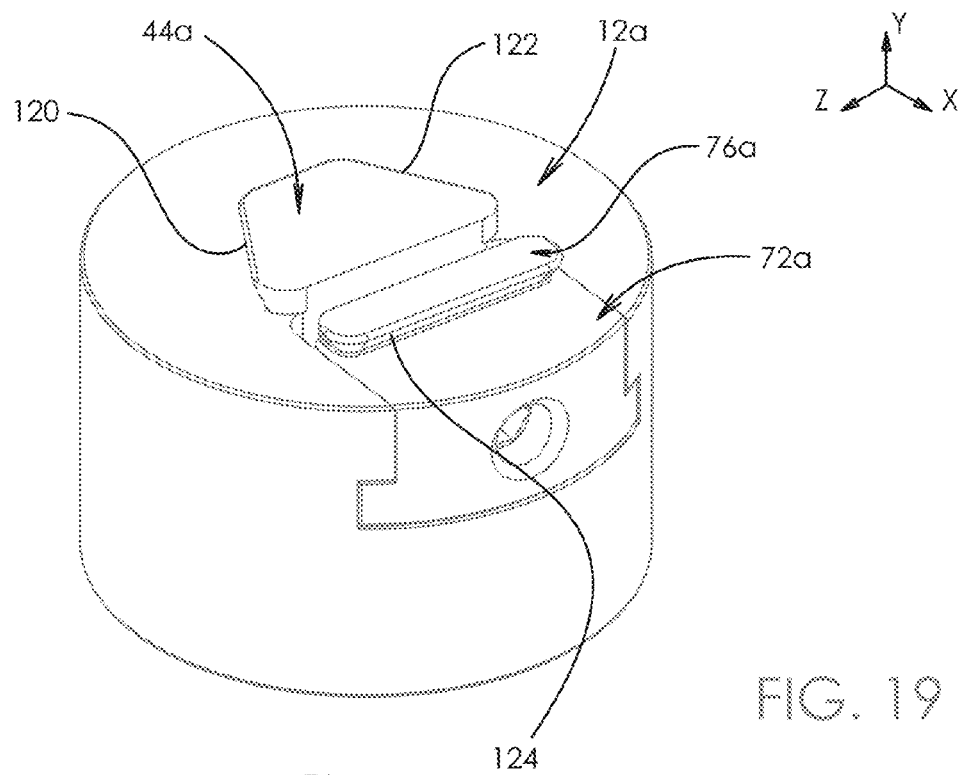
FIG. 19 is a front perspective view of a clamp head and a clamp dog in accordance with another aspect of the present invention.
Figure 20:
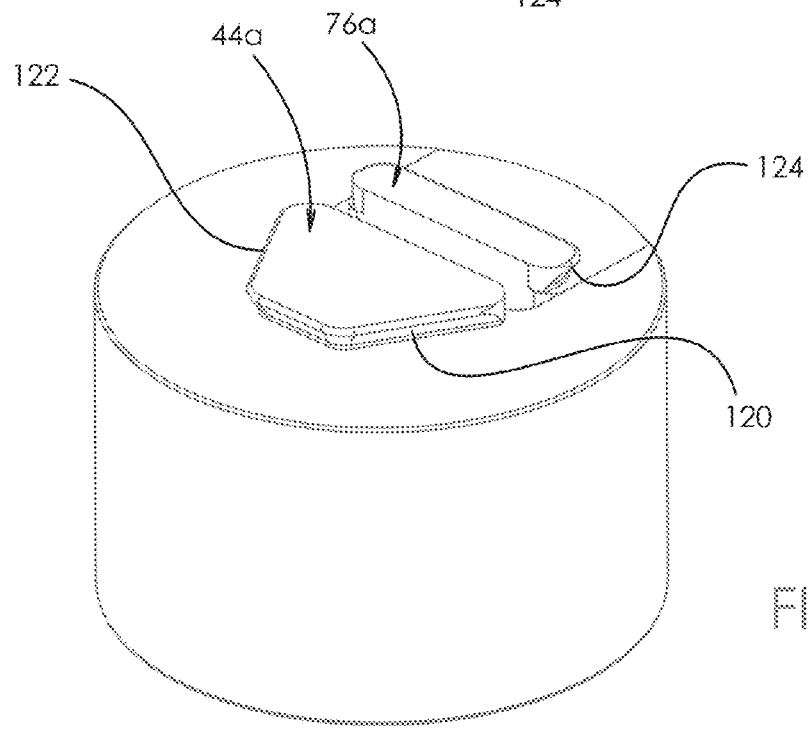
FIG. 20 is a rear perspective view of the clamp head and the clamp dog shown in FIG. 19.

Although the present invention has been described above in considerable detail with reference to certain aspects thereof, other versions are possible. Therefore, the spirit and scope of the appended claims should not be limited to the description of the aspects contained herein. For example, as best seen in FIGS. 19 and 20, it is also within the scope of the present invention to provide a clamping assembly 12a where a first protrusion 44a on a clamp head 24a includes two contact surfaces 120, 122 and a second protrusion 76a on a clamp dog 72a includes one contact surface 124. This alternative embodiment of the clamping assembly would operate in a similar manner to the version of the workpiece holder 10 described above to secure a workpiece along the x, y and z axes.

Figure 21:
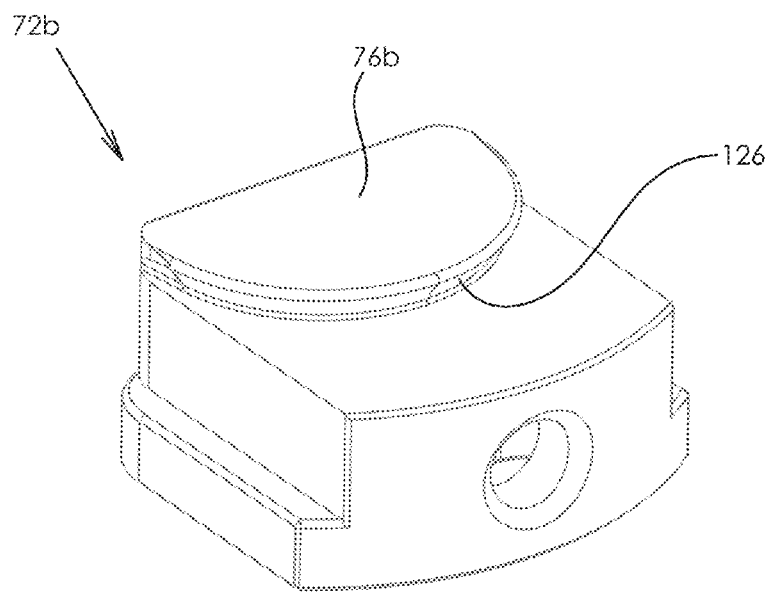
FIG. 21 is a front perspective view of a clamp dog in accordance with another aspect of the present invention.
Figure 22:
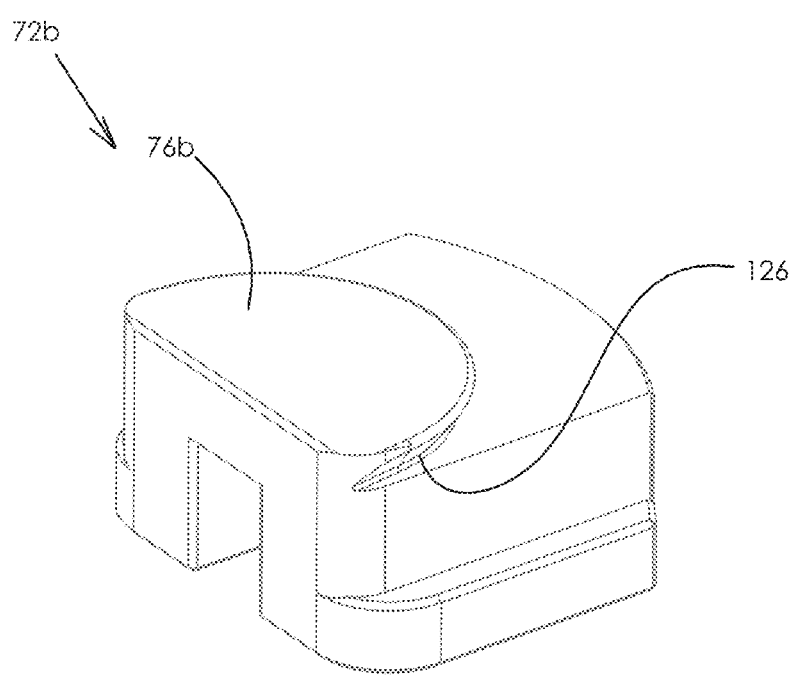
FIG. 22 is a rear perspective view of the clamp dog shown in FIG. 21.

In another example, as best seen in FIGS. 21 and 22, a clamp dog 72b may be used in place of either of the previously described clamp dogs 72, 72a. Many of the aspects of clamp dog 72b are the same as clamp dogs 72, 72a. The one difference is in the shape of second protrusion 76b, particularly, the contour of the surface that is configured for engaging dovetail wall 50. When second protrusion 76b is used in conjunction with a first protrusion on a clamp head that has a contact surface that extends endwise along its longitudinal axis, as seen in FIGS. 11-14, it is contemplated that the contact surface on second protrusion 76b may be a non-linear shape that will result in a force on dovetail wall 50 that will oppose the force imposed by the first protrusion on the clamp head along the x axis, and provide opposing forces along the z axis to eliminate the need for a separate indexing feature. For instance, contact surface on second protrusion 76b may be a semi-circular-shaped surface 126 as seen in FIGS. 21 and 22, curved, W-shaped, or any other non-linear shape or configuration that will result in the clamping mechanism securely fastening workpiece 16 to workpiece holder 10 along the x and z axes. In addition, the contact surface on the first protrusion on the clamp head may also be non-linear, such as, for example, semi-circular, curved, W-shaped or other shape that is the same as, or different than, the shape of the contact surface on second protrusion 76b. Therefore, either or both of first and second protrusions may include a contact surface that is non-linear as described herein. Furthermore, regardless of the configuration of the first and second protrusions, it should be understood that the dovetail surface 50 on workpiece 16 is configured to engage with the contact surfaces on the first and second protrusions to secure workpiece 16 to workpiece holder in all directions.

Figure 23:
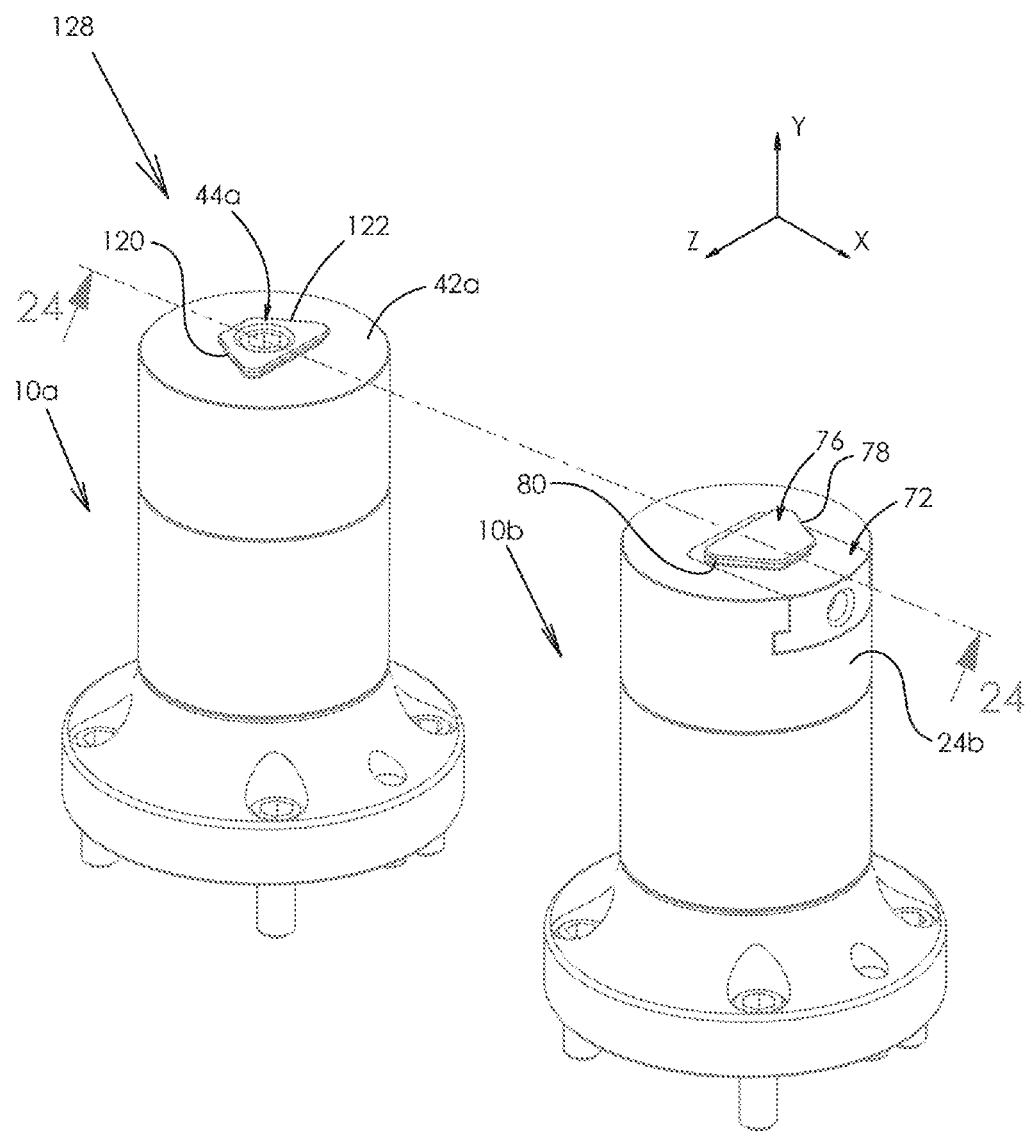
FIG. 23 is a perspective view of a system in accordance with the present invention using multiple workpiece holders to engage a workpiece.

In another aspect of the present invention, as best seen in FIGS. 23-25, a system 128 for selectively mounting a workpiece 16a relative to a support surface 22 along x, y and z axes is provided. In this aspect, instead of using just one workpiece holder 10 to secure a workpiece, system 128 uses two workpiece holders 10a, 10b in conjunction with one another to secure workpiece 16a. Workpiece 16a may have a pair of recesses 14a, 14b defined in mounting surface, wherein each of recesses 14a, 14b include a dovetail wall 50a, 50b that are configured for being engaged with workpiece holders 10a, 10b, respectively. However, it should be understood that workpiece 16a may include a single recess instead of two separate recesses 14a, 14b, wherein the single recess would include a dovetail wall that would allow first and second workpieces 10a, 10b to operate together to secure workpiece 16a to support surface 22.

For example, first workpiece holder 10a may include a first protrusion 44a having first and second contact surfaces 120, 122, each positioned at acute angles relative to a top surface 42a. First protrusion 44a is fixedly positioned relative to top surface 42a. As mentioned above with respect to the contact surfaces in the previously discussed embodiments, it is also contemplated that a single non-linear contact surface be used to engage dovetail wall 50a, such as, for example, semi-circular, W-shaped, or some other curved shape.

Figure 26:
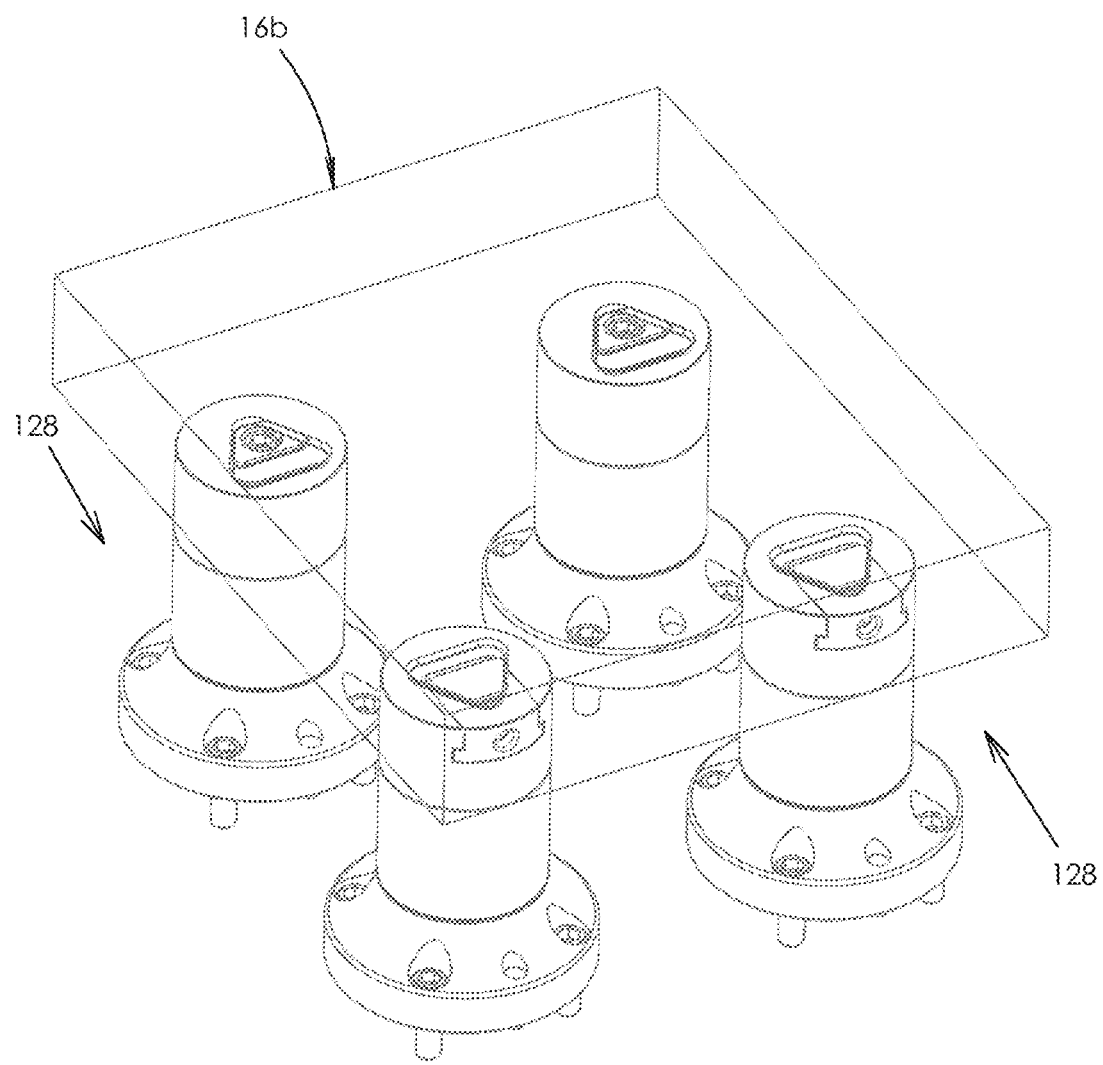
FIG. 26 is a perspective view of another exemplary embodiment of the system shown in FIG. 23.

The second workpiece holder 10b operates similar to workpiece holder 10 as described above, except that it does not include a fixed protrusion on the clamp head. Instead of using second protrusion 76 and a fixed protrusion on workpiece holder 10b to clamp the workpiece, second protrusion 76 is used in conjunction with fixed protrusion 44a on workpiece holder 10a to clamp the workpiece 16a by using adjustment mechanism 70 operatively connected with clamp head 24b and clamp dog 72 to move clamp dog 72 between the clamped and release position. While workpiece holder 10b is shown as including two contact surfaces 78, 80 it should be understood that a single non-linear contact surface be used to engage dovetail wall 50b, such as, for example, semi-circular, W-shaped, or some other curved shape. If first protrusion 44a on workpiece holder 10a is configured with two contact surfaces 120, 122 and second protrusion 76 is configured with two contact surfaces 78, 80, then each contact surface may extend endwise along their respective longitudinal axis so that longitudinal axes intersect to form a quadrilateral 130. As best seen in FIG. 26, it is also within the scope of the invention to use multiple systems 128 in conjunction with one another to secure workpiece 16b to support surface 22 as previously described.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

LIST OF REFERENCE NUMBERS

10 Workpiece holder
10a Alternative workpiece holder
10b Alternative workpiece holder
12 Clamping assembly
12a Alternative clamping assembly
14 Recess
14a Recess
14b Recess
16 Workpiece
16a Alternative workpiece
16b Alternative workpiece
18 Bottom surface
18a Alternative bottom surface
20 Stationary base clamp
22 Support surface
24 Clamp head
24a Alternative clamp head
26 Riser base
28 Mounting bolts
30 Extension member
32 Alignment pins
34 Alignment pins
36 Bolt opening
38 Longitudinal axis
40 Assembly bolt
42 Top surface
42a Alternative top surface
44 First protrusion
44a Alternative first protrusion
46 First contact surface 48 Acute angle
50 Dovetail wall
50a Alternative dovetail wall
50b Alternative dovetail wall
52 Upper wall
54 Shoulder
56 Partial slot
58 Side wall
60 Side wall
62 Bottom wall
63 Notches
64 Outer surface
66 Threaded bore
68 Distal end
70 Adjustment mechanism
72 Clamp dog
72a Alternative clamp dog
72b Alternative clamp dog
74 Top surface
76 Second protrusion
76a Alternative second protrusion
76b Alternative second protrusion
78 Second contact surface
80 Third contact surface
82 Acute angle
86 Connecting wall
88 First longitudinal axis
90 Second longitudinal axis
92 Third longitudinal axis
93a Angle
93b Angle
93c Angle
94 Upper wall
96 Shoulder
98 Side wall
100 Side wall
102 Bottom wall
104a Force
104b Force
104c Force
106 Head
108 Shank
110 Channel
112 Enlarged section
114 Stop surface
116 Stop surface
118 Access opening
120 First contact surface
122 Second contact surface
124 Third contact surface
126 Contact surface
128 System
130 Quadrilateral

What is claimed is:

1. A workpiece holder configured for being selectively mounted to a workpiece along x, y and z axes, the workpiece having a mounting surface and a recess defined in the mounting surface, the recess including a dovetail wall, the workpiece holder comprising:
    a stationary base clamp including a first top surface and a first protrusion extending from the first top surface, wherein the first protrusion includes a first contact surface positioned at a first acute angle relative to the first top surface, and wherein the stationary base clamp has a partial slot defined in the first top surface;
    a clamp dog configured for being slidably disposed within the partial slot, the clamp dog including a second top surface and a second protrusion extending from the second top surface, wherein the second protrusion includes a second contact surface, and wherein the second contact surface is positioned at a second acute angle relative to the second top surface; and
    an adjustment mechanism operatively connected with the stationary base clamp and the clamp dog to selectively move the workpiece holder between a clamped position and a release position, wherein the adjustment mechanism moves the second protrusion away from the first protrusion to the clamped position so that the first and second contact surfaces engage the dovetail wall of the recess to secure the workpiece to the workpiece holder along the x, y and z axes, and wherein the adjustment mechanism moves the second protrusion toward the first protrusion to the release position so that the first and second contact surfaces disengage the dovetail wall of the recess and the workpiece is removable from the workpiece holder.

2. A workpiece holder in accordance with claim 1, wherein at least one of the first and second contact surfaces is non-linear along a plane that is parallel with either the first top surface or the second top surface.

3. A workpiece holder in accordance with claim 2, wherein the at least one of the first and second contact surfaces is semi-circular shaped.

4. A workpiece holder in accordance with claim 1, wherein one of the first and second protrusions includes a third contact surface, wherein the third contact surface is positioned at a third acute angle relative to the first and second top surfaces.

5. A workpiece holder in accordance with claim 4, wherein the first, second, and third contact surfaces extend endwise along first, second, and third longitudinal axes, respectively, and wherein the first, second, and third longitudinal axes are disposed at acute angles relative to one another.

6. A workpiece holder in accordance with claim 5, wherein the first, second, and third longitudinal axes are disposed at sixty degree angles relative to one another.

7. A workpiece holder in accordance with claim 5, wherein the first, second, and third contact surfaces are linear.

8. A workpiece holder in accordance with claim 1, wherein the adjustment mechanism is a bolt having a head and a shank, wherein a threaded bore is defined in the stationary base clamp and configured for receiving a threaded portion of the shank.

9. A workpiece holder in accordance with claim 8, wherein the threaded portion of the shank is configured with a left-handed thread orientation.

10. A workpiece holder in accordance with claim 8, wherein the clamp dog includes a bottom wall, wherein a channel is defined in the bottom wall of the clamp dog and is configured for receiving the head and a portion of the shank.

11. A workpiece holder in accordance with claim 10, wherein the channel includes a pair of opposing stop surfaces that are configured for contacting the head of the bolt to maintain a lateral position of the bolt relative to the clamp dog.

12. A workpiece holder in accordance with claim 11, wherein the clamp dog has an access opening defined therein that extends into the channel to provide access to the head when the bolt is positioned in the channel to allow for the selective movement of the clamp dog relative to the stationary base clamp between the clamped position and the release position.

13. A workpiece holder in accordance with claim 1, wherein the stationary base clamp includes a longitudinal axis, and wherein the partial slot extends transverse to the longitudinal axis.

14. A workpiece holder in accordance with claim 1, wherein the partial slot has a T-shaped cross-section.

15. A workpiece holder in accordance with claim 1, wherein the partial slot is defined by a first shoulder, a first pair of opposing stepped side walls, and a first bottom wall, wherein the first shoulder and the first pair of opposing stepped side walls extend from the first top surface, and wherein the first bottom wall extends between the first pair of opposing stepped side walls.

16. A workpiece holder in accordance with claim 15, wherein the clamp dog includes a second shoulder, a second pair of stepped opposing side walls, and a second bottom wall disposed between the second pair of opposing stepped side walls, wherein the first pair of stepped opposing side walls and first bottom wall are configured to receive the second pair of stepped opposing side walls and the second bottom wall.

17. A workpiece holder in accordance with claim 16, wherein the first and second shoulders are both perpendicular to the first top surface.

18. A workpiece holder in accordance with claim 16, wherein the first and second shoulders contact each other in the release position.

19. A workpiece holder in accordance with claim 1, wherein the first and second acute angles are equal to one another.

20. A workpiece holder in accordance with claim 1, wherein the first and second acute angles are different from one another.

21. A workpiece holder in accordance with claim 1, wherein the stationary base clamp includes a clamp head, an extension member, and a riser base, wherein the clamp head includes the first protrusion, wherein the clamp head, the extension member, and the riser base are coupled to one another by an assembly bolt, and wherein the extension member is disposed between the clamp head and the riser base.

22. A workpiece holder in accordance with claim 21, wherein the riser base is configured for being securely mounted to a support surface.

23. A workpiece holder configured for being selectively mounted to a workpiece along x, y and z axes, the workpiece having a mounting surface and a recess defined in the mounting surface, the recess including a dovetail wall, the workpiece holder comprising:
   a stationary base clamp including a first top surface and a first protrusion extending from the first top surface, wherein the first protrusion includes a first contact surface positioned at a first acute angle relative to the first top surface, wherein the stationary base clamp has a partial slot defined in the first top surface, wherein the partial slot has a T-shaped cross-section, and wherein a threaded bore is defined in the stationary base clamp;
   a clamp dog configured for being slidably disposed within the partial slot, the clamp dog including a second top surface and a first bottom wall, wherein a second protrusion extends from the second top surface and includes a second contact surface and a third contact surface, wherein the second contact surface is positioned at a second acute angle relative to the second top surface and the third contact surface is positioned at a third acute angle relative to the second top surface, wherein a channel is defined in the first bottom wall, wherein the channel defines a pair of opposing stop surfaces, and wherein the clamp dog has an access opening defined therein that extends into the channel; and
   an adjustment mechanism operatively connected with the stationary base clamp and the clamp dog to selectively move the workpiece holder between a clamped position and a release position,
   wherein the adjustment mechanism includes a bolt having a head and a shank, wherein the threaded bore defined in the stationary base clamp is configured for receiving a threaded portion of the shank, wherein the channel is configured for receiving the head and a portion of the shank, wherein the pair of opposing stop surfaces are adjacent to the head of the bolt to maintain a lateral position of the bolt relative to the clamp dog, and wherein the access opening is positioned to provide access to the head when the bolt is positioned in the channel,
   wherein the adjustment mechanism moves the second protrusion away from the first protrusion to the clamped position by rotating the bolt so that the first, second, and third contact surfaces engage the dovetail wall of the recess to secure the workpiece to the workpiece holder along the x, y and z axes,
   wherein the adjustment mechanism moves the second protrusion toward the first protrusion to the release position so that the first, second, and third contact surfaces disengage the dovetail wall of the recess and the workpiece is removable from the workpiece holder, and
   wherein the first, second, and third contact surfaces extend endwise along first, second, and third longitudinal axes, respectively, and wherein the first, second, and third longitudinal axes are disposed at angles relative to one another.

24. A workpiece holder in accordance with claim 23, wherein the first, second, and third longitudinal axes are disposed at sixty degree angles relative to one another.

25. A workpiece holder in accordance with claim 23, wherein the stationary base clamp includes a longitudinal axis, and wherein the partial slot extends transverse to the longitudinal axis.

26. A workpiece holder in accordance with claim 23, wherein the partial slot is defined by a first shoulder, a first pair of opposing stepped side walls, and a second bottom wall, wherein the first shoulder and the first pair of opposing stepped side walls extend from the first top surface, wherein the second bottom wall extends between the first pair of opposing stepped side walls, and wherein a distal end of the threaded bore is defined in the first shoulder,
   wherein the clamp dog includes a second shoulder, a second pair of stepped opposing side walls, and the first bottom wall disposed between the second pair of opposing stepped side walls, and wherein the first pair of stepped opposing side walls and the second bottom wall are configured to receive the second pair of stepped opposing side walls and the first bottom wall.

27. A workpiece holder in accordance with claim 26, wherein the first and second shoulders are both perpendicular to the first top surface.

28. A workpiece holder in accordance with claim 26, wherein the first and second shoulders contact each other in the release position.

29. A workpiece holder in accordance with claim 23, wherein the first, second, and third acute angles are all equal to one another.

30. A workpiece holder in accordance with claim 23, wherein the first, second, and third acute angles are all different compared to one another.

31. A workpiece holder in accordance with claim 23, wherein the first, second, and third contact surfaces are linear.

32. A system for selectively mounting a workpiece relative to a support surface along x, y and z axes, the workpiece having a mounting surface and at least one recess defined in the mounting surface, the recess including a dovetail wall, the system comprising:
- a first workpiece holder including a first top surface and a first protrusion extending from the first top surface, wherein the first protrusion includes a first contact surface positioned at a first acute angle relative to the first top surface, wherein the first protrusion is fixedly positioned relative to the first top surface; and
- a second workpiece holder including:
  - a clamp head including a second top surface;
  - a partial slot defined in the second top surface;
  - a clamp dog configured for being slidably disposed within the partial slot, the clamp dog including a third top surface and a second protrusion extending from the third top surface, wherein the second protrusion includes a second contact surface, and wherein the second contact surface is positioned at a second acute angle relative to the third top surface; and
  - an adjustment mechanism operatively connected with the clamp head and the clamp dog to selectively move the clamp dog between a clamped position and a release position, wherein the adjustment mechanism moves the second protrusion away from the first protrusion to the clamped position so that the first and second contact surfaces engage the dovetail wall of the at least one recess to secure the workpiece to the first and second workpiece holders along the x, y and z axes, and wherein the adjustment mechanism moves the second protrusion toward the first protrusion to the release position so that the first and second contact surfaces disengage the dovetail wall of the at least one recess and the workpiece is removable from the first and second workpiece holders.

33. A system in accordance with claim 32, wherein at least one of the first and second contact surfaces is non-linear along a plane that is parallel with either the first top surface or the second top surface.

34. A system in accordance with claim 33, wherein the at least one of the first and second contact surfaces is semi-circular shaped.

35. A system in accordance with claim 32, wherein at least one of the first protrusion or the second protrusion includes a third contact surface, wherein the third contact surface is positioned at a third acute angle relative to the respective first or second top surface.

36. A system in accordance with claim 35, wherein the second protrusion includes a fourth contact surface, wherein the fourth contact surface is positioned at a fourth acute angle relative to the third top surface.

37. A system in accordance with claim 36, wherein the first, second, third, and fourth contact surfaces extend endwise along first, second, third, fourth longitudinal axes, respectively, and wherein the first, second, third, and fourth longitudinal axes intersect to form a quadrilateral.

38. A system in accordance with claim 32, wherein either the first protrusion or the second protrusion include a third contact surface, and wherein first, second, and third contact surfaces are linear.

* * * * *